Aug. 17, 1965  G. KIPER ETAL  3,200,721
SHUTTER AND FLASH CONTROLLING APPARATUS FOR CAMERAS
Filed Aug. 11, 1961
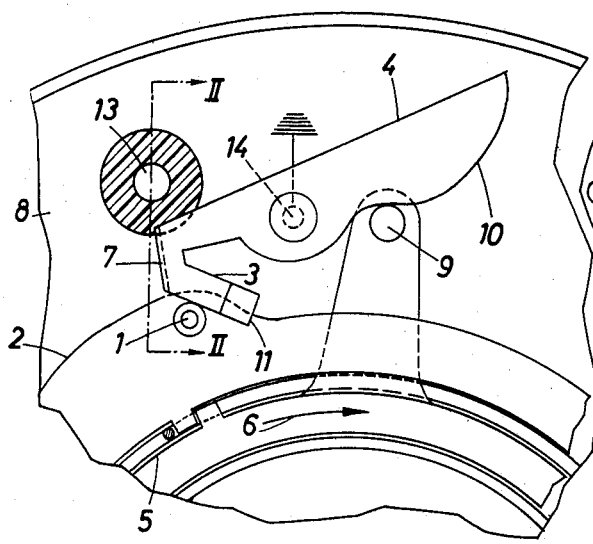
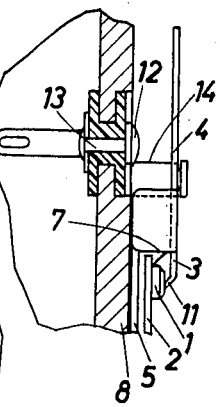
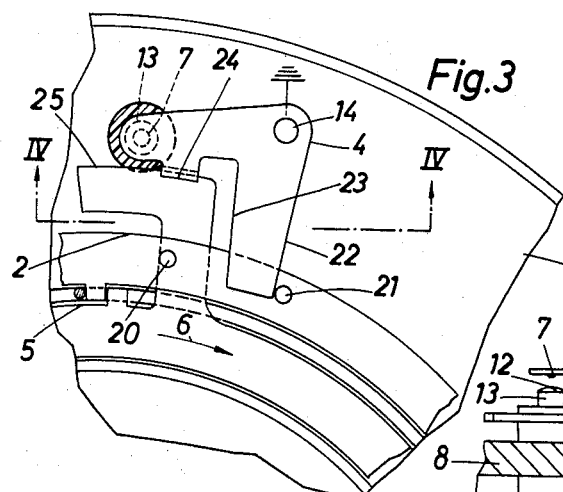
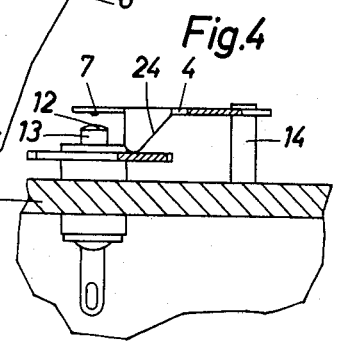
INVENTOR.
GERD KIPER
GEORG MITSCH
BY

United States Patent Office 3,200,721
Patented Aug. 17, 1965

3,200,721
SHUTTER AND FLASH CONTROLLING
APPARATUS FOR CAMERAS
Gerd Kiper, Unterhaching, near Munich, and Georg Mitsch, Munich, Germany, assignors to Agfa Aktiengesellschaft, Leverkusen-Bayerwerk, Germany
Filed Aug. 11, 1961, Ser. No. 130,896
Claims priority, application Germany, Sept. 15, 1960, A 35,575
7 Claims. (Cl. 95—11.5)

The present invention relates to cameras.

More particularly, the present invention relates to a camera having a flash assembly and especially to the shutter and flash controlling structure of a camera.

In the conventional structures of this type there is a switch which includes a stationary contact and a movable contact, and the movable contact of the switch is simply pressed against the stationary contact of the switch in order to close the circuit for igniting the flash. As is well known the metallic switch contact members due to oxidation become covered with oxide layers which are not electrically conductive, and therefore in order to assure proper closing of the circuit it is essential to provide a sufficiently great pressure between the switch contacts. This pressure must be on the order of approximately 15–20 grams in order to guarantee breaking through any oxide layers which might prevent the desired electrical contact from being made. This is a particular disadvantage in cameras where such a switch is controlled by the shutter since the shutter actuating elements must be moved with a force sufficiently great to guarantee movement of the movable switch contact in opposition to the pressure force of approximately 15–20 grams which is required to guarantee proper electrical contact. As a result the switch itself may provide an undesirable retarding in the operation of the shutter which will provide an uncontrollable variation in the length of the exposure time, and in addition because of the greater force with which the elements must act in order to reliably open the switch there is a considerably greater friction between the moving parts so that they wear out at a relatively fast rate.

It is accordingly a primary object of the present invention to overcome the above drawbacks by providing a shutter and switch assembly which is capable of reliably providing proper electrical contact between the movable and stationary contact elements of the switch where these elements engage each other with a force far less than the conventional force.

An additional object of the present invention is to provide for an assembly of the above type a movable switch contact member which need not be biased by a spring so that it becomes unnecessary to provide springs or other elements which have a force sufficiently great to provide the desired movement of the moving parts of the assembly.

It is an additional object of the present invention to provide an assembly of the above type which can be made of relatively light elements which are easily movable with respect to each other while providing a minimum of frictional wear between the moving elements and while at the same time guaranteeing that there will be no undesirable influence on the exposure time as a result of any resistance to movement provided by the switch structure which opens and closes the flash circuit.

With these objects in view the invention includes, in a camera, a pair of rotary shutter rings one of which is an opening ring which turns to open the shutter and the other of which is a closing ring which turns to close the shutter. A switch means is provided, and this switch means is movable between open and closed positions for closing the flash circuit when the switch means is in its closed position. In accordance with the present invention the switch means includes contact elements one of which slidably engages the other during at least part of the time that the switch means is in its closed position, so that as a result of this sliding engagement, any formation of oxide layers will be eliminated as a result of the sliding engagement between the switch contacts with the result that the switch contacts need not be pressed against each other with the force required by the switches conventionally used in assemblies of this type. The shutter opening ring moves a means which cooperates with the switch means to move the switch means from its open to its closed position so as to close the circuit of the flash assembly during turning of the opening ring to open the shutter, and an additional means is moved by the closing ring when the latter turns to close the shutter and cooperates with the switch means to move it from its closed to its open position so that the switch will be opened during turning of the shutter closing ring for closing the shutter. As a result of the sliding contact between the contact elements of the switch means a reliable electrical contact is provided with only a fraction of the force usually required between the contact elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary partly sectional illustration of one possible embodiment of an assembly according to the present invention;

FIG. 2 is a fragmentary section taken along line II—II of FIG. 1 in the direction of the arrows;

FIG. 3 is a fragmentary partly sectional illustration of a second possible embodiment of an assembly according to the present invention; and FIG. 4 is a fragmentary sectional view taken along line IV—IV of FIG. 3 in the direction of the arrows.

Referring now to FIGS. 1 and 2, there is shown therein a pair of rotary shutter rings 2 and 5 which in a well known manner actuate the shutter blades. Each blade is pivotally connected to one of these rings and is formed with a camming slot receiving a pin which is carried by the other ring so that when the rings turn one with respect to the other the blades will move relative to each other so as to open or close the shutter in a manner well known in the art. The shutter is of the type where both of the rings 2 and 5 turn together, which is to say without any relative movement between the rings 2 and 5, in the direction of the arrow 6 shown in FIG. 1, during cocking of the shutter. The ring 2 is the opening ring, and when shutter is released so as to make an exposure the ring 2 turns in a direction opposite to that indicated by the arrow 6 while the ring 5 remains stationary, and the result is that the shutter is opened by this turning of the opening ring 2. Thereafter, the ring 5, which is the closing ring, turns in a direction opposite to that indicated by the arrow 6 back to its initial position with respect to the ring 2 so that the shutter becomes closed. A suitable stop is provided to limit the return movement of the ring 2 to its starting position during opening of the shutter, so that the rest position of the rings 2 and 5 is determined in this way.

A switch means is provided for opening and closing the circuit of the flash apparatus which is not illustrated since it is conventional, and the switch means of the invention includes a stationary contact and a movable contact which, in accordance with the invention, has a slidable engagement with the stationary contact. The movable contact takes the form of a lever 4 which is provided at its left end, as viewed in FIG. 1, with a projection 3 terminating in a springy end portion 11 which is inclined away from the observer of FIG. 1 toward the ring 2, as is particularly evident from FIG. 2. A means is moved by the ring 2, during its opening movement for opening the shutter, for moving the lever 4 to a position closing the switch means, in a manner described below, and this means which is moved by the ring 2 takes the form of the pin 1 which is simply fixed to the ring 2 for turning movement with the latter, and it will be noted that the projection 3 with its inclined end portion 11 is in the path of movement of the pin 1. During cocking of the shutter when the shutter rings 2 and 5 are turned together in the direction of the arrow 6 of FIG. 1, the pin 1 simply moves behind the projection 3 and deflects the end portion 11 temporarily, and this end portion 11 snaps behind the pin during the further movement of the ring 2 during cocking of the shutter. The lever 4 is supported for free pivotal movement by a pin 14 which is electrically grounded, so that the movable contact 4 serves as the ground connection. The free pivotal movement of the lever 4, which forms the movable contact of the switch means, is brought about simply by supporting the lever 4 for turning movement on the pin 14 without any springs or the like cooperating with the lever 4 to urge it in one direction or the other. Thus, the movable contact element of the switch means of the invention is not acted upon by any spring or the like to provide forces which must be overcome by other moving parts of the assembly.

The lever 4 has a lug 7 which forms the contact portion of the movable contact or lever 4 and this lug 7 engages the carrier or base plate 8 which supports the entire assembly. It will be noted that during the cocking of the shutter the upper edge portion of the ring 2, which is visible in FIG. 1, engages a lower edge of the lug 7 so as to prevent turning of the lever 4 with the ring 2 when the pin 1 engages the springy portion 3 of the lever 4, and in this way the ring 2 can be turned during cocking of the shutter to a position where the moving means 1 is located beyond and spaced from the end portion 11 of the lever 4.

The shutter closing ring 5 has at its outer periphery a substantially radial projection which carries a pin 9 which forms a switch-opening means which is moved by the closing ring 5 and which cooperates with the switch means for moving it from its closed to its open position, and in order to produce this result the lever 4 is provided with a camming edge 10 which is engaged by the pin 9 so that during turning of the ring 5 to close the shutter the movement of the pin 9 along the camming edge 10 will turn the lever 4 to the position illustrated in FIG. 1. It should be noted that during cocking of the shutter the pin 9 simply moves away from the camming edge 10.

When the shutter is tripped so as to make an exposure the shutter opening ring 2 will turn back toward the position shown in FIG. 1 in advance of the shutter closing ring 5, and during this movement of the opening ring 2 the moving means 1 which is moved by the ring 2 engages the end portion 11 of the projection 3 so as to turn the lever 4 in a clockwise direction, as viewed in FIG. 1, from the position shown in FIG. 1 to a position where the lug 7 engages the stationary contact 13. The stationary contact 13 is in the form of a pin which is carried by an electrically non-conductive material which is in turn supported by the plate 8 in the manner shown most clearly in FIG. 2, and it will be noted that the stationary contact member 13 has a convexly curved contact surface 12 along which an edge of the lug 7 slides during turning of the lever 4 in a clockwise direction, as viewed in FIG. 1, for closing the switch means. The switch means will be closed by the slidable engagement between the lug 7 and the contact surface 12 just before the shutter opening ring 2 reaches its rest position, so that at this moment the flash circuit will be closed, and the pin or moving means 1 moves away from the terminal edge 11 of the springy projection 3 of the lever 4 also just before the ring 2 has reached this rest position. The ring 5 will of course follow in order to close the shutter so as to provide a predetermined exposure time in a well known manner, and during the return movement of the ring 5 in a direction opposite to that indicated by the arrow 6 the pin or moving means 9 will engage the camming edge 10 so as to return the lever 4 to the position indicated in FIG. 1, and the edge of the lug 7 which is next to the plate 8 will slide from the contact surface 12 so as to open the switch. In the rest position of the parts the lug 7 slidably engages the plate 8.

Thus, it will be seen that with the structure of the invention there is a sliding contact between the elements 4 and 13 so that it is not necessary to provide as great a pressure as would be required if the switch were closed simply by axial movement of the contacts one toward the other. It is therefore possible to provide between the lug 7 and the surface 12 a force which is on the order of 4–6 grams and a reliable electrical contact will be provided because the sliding engagement between the lug 7 and the surface 12 will prevent any accumulation of oxide layers which could disturb the electrical circuit. It will be noted that this pressure of 4–6 grams is from one-third to one-quarter of the force required with a conventional switch used in an assembly of the above type, so that the structure of the invention is not required to overcome anything like the pressure which is required for the proper operation of a conventional switch structure.

In the embodiment of the invention which is illustrated in FIGS. 3 and 4, the pair of rotary shutter rings 2' and 5' correspond to the rings 2 and 5 described above, respectively, and also turn in the same way as rings 2 and 5.

In this embodiment the shutter opening ring 2' carries a pair of pins 20 and 21, the pin 21 forming the means which is moved by the shutter opening ring 2' and which cooperates with the switch means to move the switch means from its open to its closed position. The shutter closing ring 5' is provided with a substantially L-shaped projection 25 for a purpose described below. It is this projection 25 which forms the means moved by the shutter closing ring 5' and cooperating with the switch means for moving the switch means from its closed to its open position.

The switch means of FIGS. 3 and 4 includes the stationary contact member 13' which is insulated from the plate 8 and which has a convexly curved contact surface 12', as is most clearly apparent from FIG. 4. The lever 4' forms the movable element of the switch means of FIGS. 3 and 4 and is supported for free turning movement by the pivot pin 14' which in this case also is carried by the plate 8 and which forms the ground connection, so that through the movable lever or switch member 4' the contacts are connected to ground. It will be noted that in this case also there is no spring or other element which urges the lever 4' to turn in one direction or the other. The lever 4' has one arm which extends between the pins 20 and 21 which are carried by the shutter opening ring 2', and during cocking of the shutter the pin 20 cooperates with the edge 23 of the lever 4' to turn the lever 4' in a counterclockwise direction, as viewed in FIG. 3, while during opening of the shutter the pin 21 cooperates with the edge 22 of the lever 4' to turn the latter in a clockwise direction, as viewed in FIG. 3, and at this time the pin 21 forms the means which is moved by ring 2' and which cooperates with the switch means to move it from its open to its closed position. The lever 4' has a contact portion 7' which slidably engages the convex surface 12' of the stationary contact 13' in order to close the switch. In addition, the arm of the lever 4' which is adjacent to the stationary contact 13' has a lug 24 directed toward the plate 8 and provided with a right inclined edge, as viewed in FIG. 4, this inclined edge of the lug 24 cooperating with the projection 25 in a manner described below.

The parts are shown in FIGS. 3 and 4 in their rest position where the lug 24 engages the projection 25 so that the contact portion 7' is prevented from engaging surface 12'. The arm of lever 4' which is provided with contact portion 7' is springy and by its own resiliency tends to move toward plate 8. When contact portion 7' is out of alignment with contact 13' and projection 25 out of engagement with lug 24, this lug engages plate 8 due to the resiliency of the lever 4' and turning of lever 4' at this time in a clockwise direction, as viewed in FIG. 3, places contact portion 7' in engagement with the surface 12'.

During cocking of the shutter the rings 2' and 5' turn in unison in the direction of the arrow 6 of FIG. 3, and shortly after the beginning of the cocking movement the pin 20 engages the edge 23 to turn the lever 4' in a counterclockwise direction, as viewed in FIG. 3. As a result the lug 24 remains in engagement with the projection 25 of the closing ring 5 during cocking of the shutter, at least during the initial portion of the shutter cocking operation, and when the lever 4' has been turned sufficiently so as to locate the contact portion 7' beyond the stationary contact 13' the projection 25 will move away from the lug 24 which now approaches and engages the plate 8 due to the resiliency of the lever 4' at its arm which has the lug 24 and the contact portion 7'. Thus, when the shutter is cocked the pin 20 engages the edge 23 of the lever 4', the contact portion 7' of the lever 4' is located beyond the stationary contact member 13', and the projection 25 of the shutter closing ring 5' is located beyond the lug 24 which at this time engages the plate 8.

During release of the shutter, after it is tripped by the operator, the shutter opening ring 2' returns to its starting or rest position and of course the pin 20 moves away from the edge 23 while the pin 21 moves into engagement with the edge 22 so as to turn the lever 4' in a clockwise direction, as viewed in FIG. 3. The ring 5' is stationary at this time so that the projection 25 does not approach the lug 24. Thus, the pin 21 forms a means moved by the ring 2' and moving the lever 4' so as to cause the contact portion 7' thereof to approach and engage and slide along the convex surface 12' while the switch is closed. When the ring 2' reaches its starting position the parts will have the position indicated in FIG. 3, and it will be noted that in this position the pin 21 is still in engagement with the edge 22 while the contact portion 7' is aligned with the stationary contact member 13'.

Return of the ring 5' to its starting position, so as to close the shutter, causes the projection 25 thereof to engage the inclined edge of the lug 24 so as to move this lug 24 away from the plate 8, and as a result the contact portion 7' is moved axially away from the surface 12' so as to open the switch, and in this way the circuit is again opened and the parts will have the rest position indicated in FIGS. 3 and 4.

It will be seen, therefore, that with both embodiments of the invention the movable switch member slidably engages the stationary switch member so as to prevent the formation of any oxide layers which will disturb the contact between the elements of the switch, and thus with the embodiment of FIGS. 3 and 4 as well as with that of FIGS. 1 and 2 it is only required to provide a fraction of the pressure between the contact elements which is required by conventional contact elements. As a result, with the structure of the invention the parts may be quite light and will nevertheless turn quite easily one with respect to the other without being required to overcome any substantial forces of friction, and it will be noted that this result is obtained by the fact that the sliding contact between the switch elements eliminates the necessity of a pressure between these elements as great as is required by conventional structures. Also, the fact that the levers 4 and 4' are not urged continuously in one direction or the other by a spring or the like prevents these levers from retarding the return of the ring 5 to its starting position so that these levers cannot have any undesirable and uncontrollable influence on the exposure time.

It will be understood that each of the elements described above, or two or more together, may also find a useful application in other types of cameras differing from the types described above.

While the invention has been illustrated and described as embodied in shutter and flash assemblies for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a pair of rotary shutter rings one of which is an opening ring for opening the shutter and the other of which is a closing ring for closing the shutter; switch means movable between open and closed positions for closing a flash circuit when said switch means is in said closed position thereof, said switch means including a stationary contact and a movable contact which slidably engages said stationary contact at least during part of the time that said switch means is in said closed position thereof, said movable contact being in the form of a lever and the electrical circuit including a pivot pin supporting said lever for free turning movement; switch-closing means moved by said opening ring when the latter turns to open the shutter and moving said lever in a direction which places said movable contact in engagement with said stationary contact to close said switch means; and switch-opening means moved by said closing ring when the latter turns to close the shutter and moving said lever in a direction which places said movable contact out of engagement with said stationary contact to place said switch means in said open position thereof.

2. In a camera, in combination, a pair of rotary shutter rings one of which is an opening ring for opening the shutter and the other of which is a closing ring for closing the shutter; switch means including a stationary contact and a lever which forms a movable contact and which is turnable to a position engaging said stationary contact for closing said switch means so as to close a flash circuit in which said switch means is located, said lever being turnable also to a position spaced from said stationary contact to open said switch means for opening said circuit, said lever during turning slidably engaging said stationary contact when said switch means is closed; a pivot pin supporting said lever for turning movement; switch-closing means carried by said opening ring and engaging and turning said lever to a position engaging said stationary contact during turning of said opening ring when the latter turns to open the shutter; and switch-opening means carried by said closing ring for turning movement therewith and engaging said lever during turning of said closing ring for moving said lever to a position spaced from said stationary contact to open said switch means when said closing ring turns to close the shutter.

3. In a camera, in combination, a pair of rotary shutter rings one of which is an opening ring for opening the shutter and the other of which is a closing ring for closing the shutter; a pair of pins respectively carried by said rings for turning movement therewith; a stationary switch contact; a switch lever having a lug adapted to be moved into and out of engagement with said stationary contact and slidably engaging said stationary contact for closing a circuit of a flash assembly during contact between said lug and said stationary contact, said lever having a projection located in the path of movement of the pin carried by said opening ring and a camming edge located in the path of movement of said pin of said closing ring, said opening ring during turning to open the shutter moving said pin carried by said opening ring into engagement with said projection for turning said lever in a direction which moves said lug into slidable engagement with said stationary contact for closing the circuit of the flash apparatus and said pin of said closing ring engaging said camming edge, during turning of said closing ring to close the shutter, and turning said lever in a direction which moves said lug away from said stationary contact to open the circuit of the flash apparatus; and a pivot pin supporting said lever for free turning movement.

4. In a camera, in combination, a pair of rotary shutter rings one of which is an opening ring for opening the shutter and the other of which is a closing ring for closing the shutter, said opening ring turning with respect to said closing ring to open the shutter and said closing ring turning with respect to said opening ring to close the shutter, both of said rings turning together in one direction during cocking of the shutter and said rings turning one after the other in opposite direction during opening and closing of the shutter; a pair of pins carried by said opening ring for turning movement therewith; a projection carried by said closing ring for turning movement therewith; a stationary contact; a pivot pin; and a lever supported for free turning movement by said pivot pin, said lever having one arm extending between said pins which are carried by said opening ring and a second arm located adjacent said stationary contact and having a contact portion adapted to slidably engage said stationary contact for closing a circuit of a flash apparatus, said second arm of said lever having a lug located in the path of turning movement of said projection of said closing ring during turning of the latter to close the shutter, one of said pins of said opening ring engaging an edge of said first-mentioned arm of said lever to turn the latter to a predetermined position during opening of the shutter and the other of said pins engaging another edge of said first-mentioned arm during turning of said opening ring to open the shutter for moving said contact portion of said second arm into slidable engagement with said stationary contact for closing the circuit of said flash apparatus, said projection of said closing ring engaging said lug of said second arm of said lever to move said contact portion axially away from said stationary contact member during turning of said closing ring with respect to said opening ring to close the shutter.

5. In a camera, in combination, a camera body; a pair of coaxial rotary shutter rings mounted on said camera body for turning movement, one of said rings being a rotary opening ring for opening the shutter and the other of said rings being a rotary closing ring for closing said shutter; switch means mounted on said camera body and including a stationary contact mounted on said camera body and a movable contact means mounted also on said camera body adjacent to the peripheries of said rotary shutter rings, said movable contact means including a switch closing portion, movement of which along a first predetermined path will move said movable contact means into engagement with said stationary contact so as to close said switch means and a switch opening portion movement of which along a second predetermined path will move said movable contact means out of engagement with said stationary contact so as to open said switch means; switch closing means mounted on said rotary opening ring and engaging said switch closing portion of said movable contact means for moving the same along said first predetermined path during rotation of said rotary opening means to open the shutter so as to move said movable contact means into engagement with said stationary contact so as to close said switch means; and switch opening means mounted on said rotary closing ring and engaging said switch opening portion of said movable contact means for moving the same along said second predetermined path during rotation of said rotary closing ring to close the shutter so as to move said movable contact means out of engagement with said stationary contact so as to open said switch means.

6. In a camera according to claim 5, said movable contact means consisting of a lever pivoted between its ends to the camera body and having a switch closing portion located on one side of the point of pivoting of said lever and a switch opening portion located on the other side of said pivoting point.

7. In a camera according to claim 5, said switch closing means consisting of an abutment on the rotary opening ring and said switch opening means consisting of another abutment on said rotary closing ring.

References Cited by the Examiner
UNITED STATES PATENTS

| 2,641,978 | 6/53 | Lawson | 95—11.5 |
| 2,772,614 | 12/56 | Rentschler | 95—11.5 |
| 2,960,922 | 11/60 | Takahama | 95—11.5 |
| 2,978,970 | 4/61 | Fahlenberg | 95—11.5 |

JOHN M. HORAN, *Primary Examiner.*

NORTON ANSHER, *Examiner.*